United States Patent [19]

O'Dwyer et al.

[11] 4,182,577
[45] Jan. 8, 1980

[54] MOP SWIVEL CONNECTOR

[75] Inventors: Michael F. O'Dwyer, Edgewood, Ky.; John J. Feroce, Marion, Mass.; David A. Jones, Dayton, Ohio

[73] Assignee: The Drackett Company, Cincinnati, Ohio

[21] Appl. No.: 867,060

[22] Filed: Jan. 5, 1978

[51] Int. Cl.$^2$ .............................................. F16O 11/00
[52] U.S. Cl. .................... 403/74; 64/17 SP; 15/144 A
[58] Field of Search ................ 403/58, 57, 74; 64/17 R, 17 SP; 15/144 A

[56] References Cited
U.S. PATENT DOCUMENTS

| | | | |
|---|---|---|---|
| 364,503 | 6/1887 | Fenner | 64/17 R |
| 2,310,011 | 2/1943 | Cave et al. | 403/58 |
| 2,407,421 | 9/1946 | Herold | 403/58 |
| 2,940,800 | 6/1960 | Knapp | 403/58 |
| 2,943,892 | 7/1960 | Hessler | 403/58 |
| 3,778,860 | 12/1973 | Thielen | 64/17 R X |

FOREIGN PATENT DOCUMENTS 612234 11/1948 United Kingdom ................ 403/57

Primary Examiner—Andrew V. Kundrat
Attorney, Agent, or Firm—Sharon A. Blinkoff; George A. Mentis; David J. Mugford

[57] ABSTRACT

A swivel connector for attaching a handle to a body which comprises:
 (a) a pivot member secured to said body;
 (b) a pin member including first rotational means for rotatably engaging said pivot member to define a first axis of rotation for rotating the pin member about the pivot member; and
 (c) a socket member having an upper end portion adapted to receive a handle and including at the lower end portion second rotational means for rotatably engaging said pin member to define a second axis of rotation for rotating the socket member about the pin member such that said first and second axis of rotation are substantially perpendicular and intersect each other.

7 Claims, 8 Drawing Figures

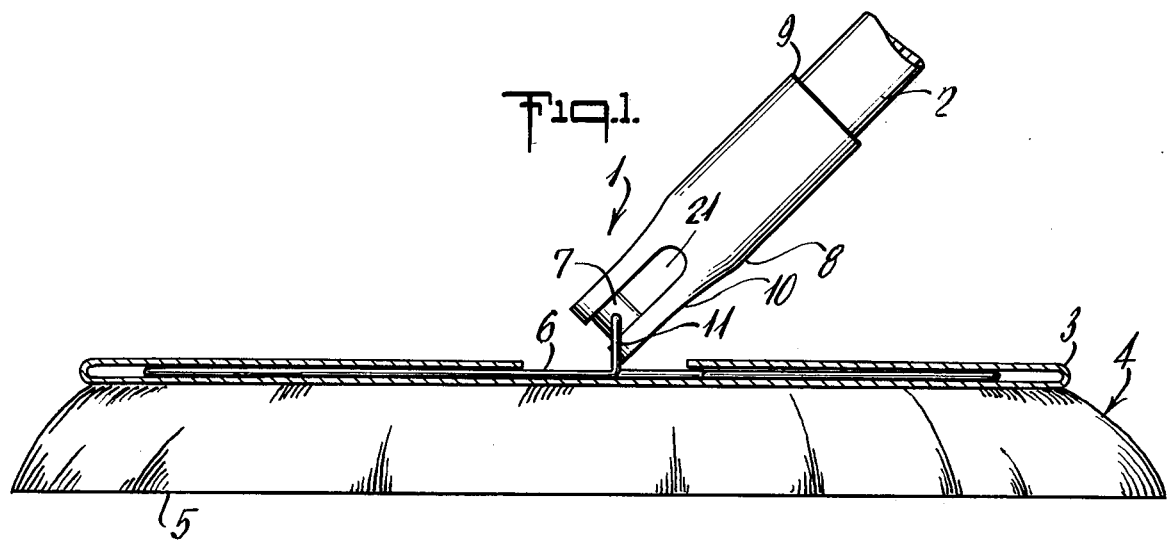
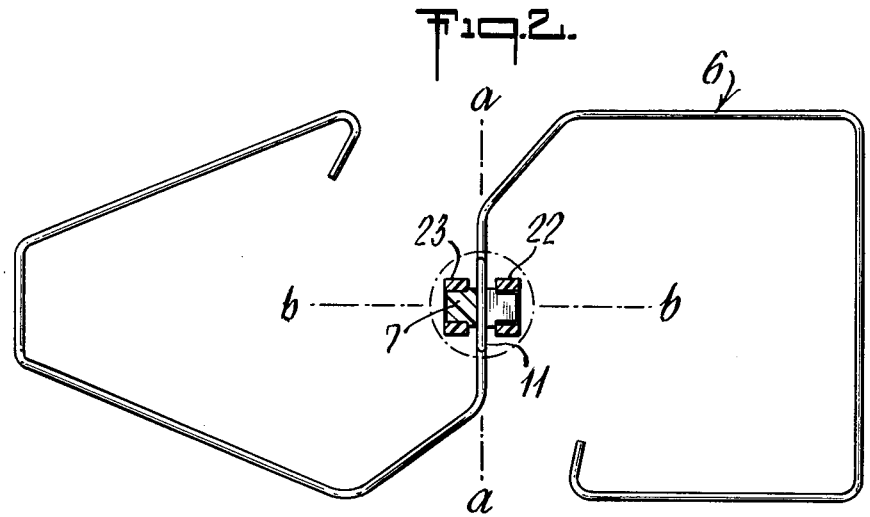
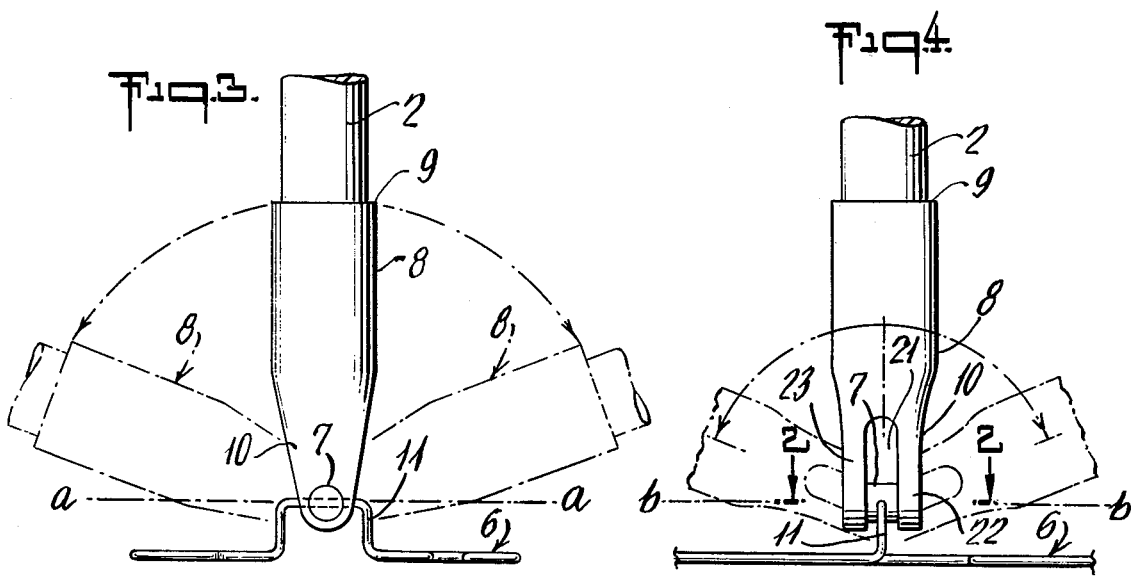

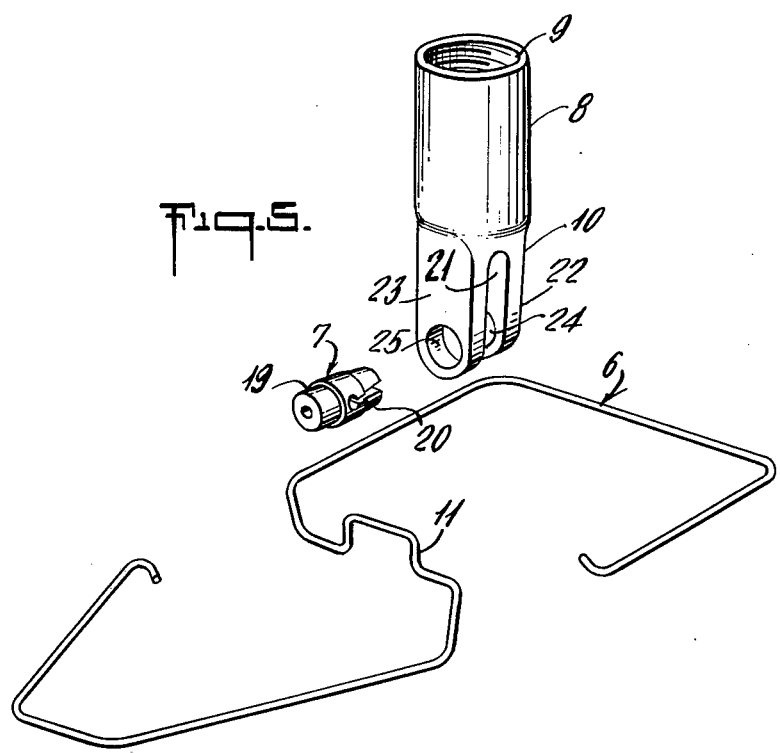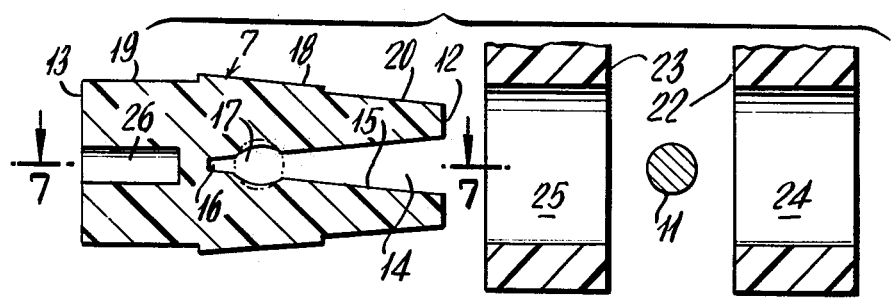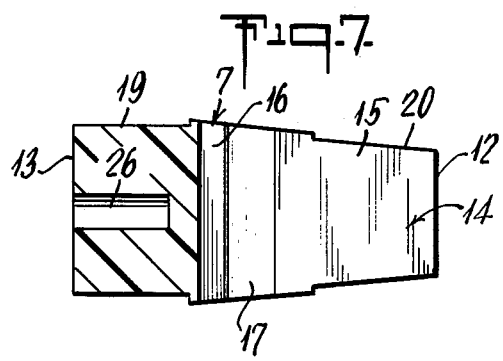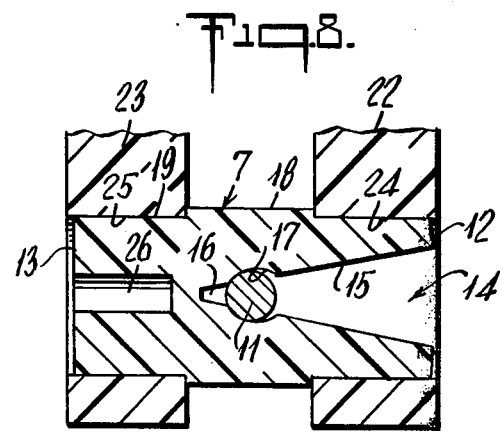

4,182,577

MOP SWIVEL CONNECTOR

BACKGROUND OF THE INVENTION

This invention relates to improvements in swivel connectors, and more particularly swivel connectors for mops and the like.

In the operation of mops or other cleaning or polishing devices, it is often desirable to move the mop body, which may be elongated, first in a longitudinal direction and then in a direction in which the length of the mop body is utilized to provide a wide sweeping action. While a connection providing such a compound movement can be provided, it is found that the multiple pivot connections give a rather loose or lost-motion connection which makes it difficult for the operator to accurately and easily control the movement of the mop body. Even if the connection about one of the pivots is tightened, it is found that the tight connection gives way under use, and before long the same loose structural connection above referred to obtains.

The prior art includes several patents which disclose mops and brooms having multiple pivot connections with non-intersecting rotational axis for the connections. U.S. Pat. Nos. 2,043,464 to Claxon; 2,940,800 to Knapp; 2,943,892 to Hessler et al; 3,152,348 to Zelinkoff; 3,315,296 to Richardson; 3,340,556 to Allen; 3,719,378 to Windsor; 3,778,860 to Thieleu and 2,932,048 to Yamen et al exemplify such prior art.

Furthermore, the above cited devices do not utilize the technology which is currently being applied in the home consumer market. for example, the aforementioned devices do not utilize resilient, light plastic supporting structures which can be readily assembled. Consequently, the aforedescribed devices cannot be broken down into easily assembled component parts for storage and shipment. It is well known that great economy results from being able to store and ship unassembled articles, and the cleaning implements of the prior art do not teach how to apply this economy to dust mops purchased by consumers for home use.

Additionally, U.S. Pat. No. 3,911,521 to Franchot is representative of a dust mop utilizing plastic structural components, but providing for a swivel connector having perpendicular non-intersecting axis of rotation for the pivot connections.

SUMMARY OF THE INVENTION

In view of the above described problems, it is an object of the instant invention to provide a new and improved swivel connector.

Accordingly, disclosed herein is a swivel connector for attaching a handle to a body which comprises:

(a) a pivot member secured to said body;

(b) a pin member including first rotational means for rotatably engaging said pivot member to define a first axis of rotation for rotating the pin member about the pivot member; and (c) a socket member having an upper end portion adapted to receive a handle and including at the lower end portion second rotational means for rotatably engaging said pin member to define a second axis of rotation for rotating the socket member about the pin member such that said first and second axis of rotation are substantially perpendicular and intersect each other.

In another embodiment, the first rotational means comprises an open first end and a second end, said pin member including a first bifurcation having a closed end and a guideway diverging outwardly from the closed end toward the first end, and including an enlarged cutout for rotatably engaging said pivot member.

In still another embodiment, the cutout is located intermediate the first end and the closed end of the first bifurcation, said pin member further including a flange encircling a portion of the surface of the pin member intermediate the first and second ends and terminating in bearing portions at each end of the flange, the flange extending along the length of the pin member approximately from the closed end to a point short of the first end and overlapping the cutout and a portion of the guideway, said flange and bearing portion nearest the first end each having surfaces which are tapered along their respective lengths toward said first end.

In still another embodiment, the second rotational means comprises a second bifurcation, each arm of which has an opening therethrough for rotatably engaging the pin member.

In still another embodiment, the second rotational means comprises a second bifurcation each arm of which has an opening therethrough for rotatably engaging respectively each of said pin member bearing portions whereby insertion of the pin member first end through each of the socket member arm openings to rotatably engage in said cutout the pivot member between said arms of the socket member causes the bearing portion nearest said first end and the flange to be stressed diametrically outward such that the pin member is substantially prevented from moving relative to the socket member arms in a direction parallel to said second axis of rotation.

In still another embodiment, the pin member is of generally cylindrical shape.

In still another embodiment, the pin member is formed of a resilient material.

BRIEF DESCRIPTION OF THE DRAWINGS

FIG. 1 is a side view of a cleaning implement, such as a mop, including a swivel connector according to the invention, showing how the swivel connector is attached to a handle (broken away) at its upper end and to a body, such as a sleeve which holds a fabric mop head as shown;

FIG. 2 is a top sectional view of the swivel connector of FIG. 4 taken along the line 2—2 (the fabric mop head removed);

FIG. 3 is a front elevational view of the swivel connector of FIG. 1, showing the swivel connector in three operative positions, two of which are drawn in phantom;

FIG. 4 is a side elevational view of the swivel connector of FIG. 1, showing the swivel connector in three operative positions, two of which are drawn in phantom;

FIG. 5 is a perspective view of the swivel connector of FIG. 1 (the handle sleeve and mop head removed) with the component parts disconnected;

FIG. 6 is an enlarged front elevational view showing one embodiment of a swivel connector according to the invention with component parts shown disassembled and in cross section;

FIG. 7 is a top sectional view of an embodiment of the pin member shown in FIG. 6 and taken along the line 7—7; and FIG. 8 is an enlarged front elevational view of the embodiment of a swivel connector shown in FIG. 6 with the component parts shown assembled and in cross section.

DETAILED DESCRIPTION OF THE DRAWINGS

Referring now to FIG. 1, there is shown a mop including a swivel connector, generally designated 1, for connecting a handle 2 to a body, such as a sleeve 3, which holds a fabric mop head 4 having an array of fabric strands 5—5 which are used to collect dust. It is to be understood that the array of fabric strands 5 may also be any type of dirt-removing or dirt-transporting fabric or device.

Swivel connector 1 includes a pivot member 11, which is rotatably engaged by a pin member 7 to define a first axis of rotation a—a (shown in FIG. 2), and a socket member 8 having an upper end portion 9 and a lower end portion 10, the socket member rotatably engaging the pin 7 at the lower end portion 10 to define a second axis of rotation b—b (shown in FIG. 2) which is substantially perpendicular to and intersects the first axis of rotation a—a. The socket member upper end portion 9 is capable of fixedly engaging handle 2, such as by threadably receiving the same.

In the embodiment shown, pivot member 11 is an upwardly-projecting bent portion in the middle portion of a generally S-shaped frame 6, which is fixedly received by sleeve 3.

As is best shown in FIGS. 3 and 4, the combination of handle 2 and socket member 8 are capable of rotating about axis b—b which coincides with the longitudinal axis for pin member 7. Also, simultaneously or independently thereof, the combination of handle 2, socket member 8 and pin member 7 are capable of rotating about axis a—a which coincides with and is defined by pivot member 11 in the embodiment shown. The arc of rotation about either axis a—a or b—b can vary independently of each other to a maximum of about 180°. However, higher values can be obtained depending on the proper choice of dimensions, location and shape of the structural components of the swivel connector and mop assembly.

In the embodiment shown in FIGS. 6-8, generally cylindrically-shaped pin member 7 includes an open first end 12 and a second end 13, and further includes a first bifurcation 14 having a closed end 16 and a guideway 15 diverging outwardly from the closed end 16 to the open first end 12. The bifurcation 14 additionally includes an enlarged cutout 17 which is slightly smaller in diameter than the diameter of pivot member 11. The cutout 17 is located at a point intermediate the first end 12 and the closed end 16 of the bifurcation 14.

Pin member 7 further includes a slight flange 18 encircling a portion of the surface of the pin member 7 intermediate the first end 12 and second end 13, and terminating in bearing portions 19 and 20 at each end of the flange 18. Flange 18 extends along a portion of the length of pin member 7 approximately from the closed end 16 to a point short of the first end 12 and overlapping the cutout 17 and a portion of the guideway 15. Flange 18 and bearing portion 20 each have surfaces which are tapered along their respective lengths toward the first end 12. Partial central bore 26 located in the proximity of the second end 13 can be included to prevent contraction of the pin member material, if resilient plastic, during molding operations and therefore maintain dimensional accuracy for the pin member 7.

In the embodiment shown in FIGS. 3 and 4, the lower end portion 10 of socket member 8 includes a second bifurcation 21 having arms 22 and 23 containing axially-aligned openings 24 and 25 (shown in FIG. 6) for rotatably engaging, respectively, bearing portions 19 and 20 of pin member 7.

Thus as is shown in FIGS. 5, 6 and 8, the swivel connector 1 is assembled by first placing pivot member 11 of frame 6 between the arms 22 and 23 of socket member 8 such that axis a—a defined by the pivot member 11 is perpendicular to and intersects the axis b—b defined by the axis of aligned openings 24 and 25. Then inserting the first end 12 of pin member 7 through opening 25 and sliding the guideway 15 past pivot member 11 while the first end 12 is simultaneously inserted into opening 24. As pivot member 11 is urged initially through the guideway 15, having an opening at the first end 12 which is larger than the diameter of pivot member 11, and then toward cutout 17 the arms 27 and 28 of the first bifurcation 14 are urged outwardly when the guideway opening becomes smaller than the diameter of pivot member 11 until it is captured in cutout 17 to provide rotatable engagement of pin member 7 about pivot member 11. At the same time, the flange 18 of pin member 7 has been urged past opening 25, and flange 18 and bearing portions 20 of arms 27 and 28 are stressed diametrically outward such that pin member 7 is substantially prevented from moving relative to the socket member in a direction parallel to the axis b—b.

While it is preferable that socket member 8 and pin member 7 be made of resilient, self-lubricating plastic material to facilitate easy assembly and operation, it does not mean that other materials such as metal, ceramics, wood and the like cannot be used herein.

While a preferred embodiment of the invention has been described herein it is to be understood that such description is only exemplary with many different embodiments of this invention being possible without departing from the spirit or scope thereof as defined in the appended claims.

For example, it is contemplated that the cleaning implement described, with suitable modifications by anyone skilled in the art, has other applications such as waxing, polishing, as well as application of surface treating substances such as insect repellents, dust repellants, etc.

What is claimed is:

1. A swivel connector for attaching a handle to a body which comprises:
   (a) a pivot member securable to the body;
   a bifurcated pin member secured to the pivot member and rotatable through a first axis of rotation about the pivot member; and
   (c) a socket member having an upper end portion adapted to receive the handle and a lower end portion secured to the pin member, the socket member being rotatable through a second axis of rotation about the pin member, whereby the socket member is rotatable through any axis of rotation, including said first and second axes, about the pivot member.

2. The connector of claim 1 wherein said pin member is of generally cylindrical shape.

3. The connector of claim 1 wherein said pin member is formed of a resilient material.

4. A swivel connector for attaching a handle to a body which comprises:
   (a) a pivot member secured to said body;

(b) a pin member including first rotational means for rotatably engaging said pivot member to define a first axis of rotation for rotating the pin member about the pivot member; and (c) a socket member having an upper end portion adapted to receive a handle and including at the lower end portion second rotational means for rotatably engaging said pin member to define a second axis of rotation for rotating the socket member about the pin member such that said first and second axis of rotation are substantially perpendicular and intersect each other, said first rotational means comprises an open first end and a second end, said pin member including a first bifurcation having a closed end and a guideway diverging outwardly from the closed end toward the first end, and including an enlarged cutout for rotatably engaging said pivot member.

5. The connector of claim 4 wherein said cutout is located intermediate the first end and the closed end of the first bifurcation, said pin member further including a flange encircling a portion of the surface of the pin member intermediate the first and second ends and terminating in bearing portions at each end of the flange, the flange extending along the length of the pin member approximately from the closed end to a point short of the first end and overlapping the cutout and a portion of the guideway, said flange and bearing portion nearest the first end each having surfaces which are tapered along their respective lengths toward said first end.

6. The connector of claim 4 wherein said second rotational means comprises a second bifurcation, each arm of which has an opening therethrough for rotatably engaging said pin member.

7. The connector of claim 5 wherein said second rotational means comprises a second bifurcation each arm of which has an opening therethrough for rotatably engaging respectively each of said pin member bearing portions whereby insertion of the pin member first end through each of the socket member arm openings to rotatably engage in said cutout the pivot member between said arms of the socket member causes the bearing portion nearest said first end and the flange to be stressed diametrically outward such that the pin member is substantially prevented from moving relative to the socket member arms in a direction parallel to said second axis of rotation.

* * * * *